US006647473B1

(12) United States Patent
Golds et al.

(10) Patent No.: US 6,647,473 B1
(45) Date of Patent: *Nov. 11, 2003

(54) KERNEL-BASED CRASH-CONSISTENCY COORDINATOR

(75) Inventors: David P. Golds, Redmond, WA (US); Norbert P. Kusters, Woodinville, WA (US); Brian D. Andrew, Redmond, WA (US); Daniel E. Lovinger, Seattle, WA (US); Supriya Wickrematillake, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/505,344

(22) Filed: Feb. 16, 2000

(51) Int. Cl.$^7$ .............................................. G06F 13/00
(52) U.S. Cl. ...................... 711/161; 711/202; 711/203; 711/204; 707/204
(58) Field of Search .......................... 711/161; 707/202, 707/203, 204, 511

(56) References Cited

U.S. PATENT DOCUMENTS

| | | | | |
|---|---|---|---|---|
| 5,175,849 A | | 12/1992 | Schneider | 707/202 |
| 5,369,757 A | * | 11/1994 | Spiro et al. | 714/19 |
| 5,403,639 A | * | 4/1995 | Belsan et al. | 707/204 |
| 5,761,526 A | * | 6/1998 | Sakakura et al. | 395/821 |
| 5,819,292 A | | 10/1998 | Hitz et al. | 707/203 |
| 5,915,264 A | * | 6/1999 | White et al. | 711/168 |
| 5,956,713 A | | 9/1999 | Bamford et al. | 707/8 |
| 5,963,959 A | | 10/1999 | Sun et al. | 707/200 |
| 6,023,744 A | | 2/2000 | Shoroff et al. | 711/4 |
| 6,038,639 A | | 3/2000 | O'Brien et al. | 711/114 |
| 6,105,030 A | * | 8/2000 | Syed et al. | 707/10 |
| 6,182,198 B1 | * | 1/2001 | Hubis et al. | 711/162 |
| 6,289,335 B1 | | 9/2001 | Downing et al. | 707/3 |
| 6,289,356 B1 | | 9/2001 | Hitz et al. | 707/201 |
| 6,341,341 B1 | | 1/2002 | Grummon et al. | 711/162 |
| 6,473,775 B1 | * | 10/2002 | Kusters et al. | 707/200 |
| 2001/0008019 A1 | * | 7/2001 | Vert et al. | 714/1 |
| 2001/0044807 A1 | * | 11/2001 | Kleiman et al. | 707/203 |

* cited by examiner

*Primary Examiner*—Reba I. Elmore
(74) *Attorney, Agent, or Firm*—Law Offices of Albert S. Michalik, PLLC (57) ABSTRACT

A snapshot system capable of capturing snapshots of multiple volumes wherein the snapshots are coordinated. A snapshot manager determines which volumes are to be involved in a snapshot operation, and issues a message to the file system for each volume involved, each message including information sufficient to identify the volumes involved in the snapshot operation. Each file system passes its respective message down to a coordinator mechanism. The coordinator mechanism coordinates the state of each of the volumes, such as by holding writes thereto, to put each volume into a quiescent state, and then enables the snapshot to be captured. When the snapshots are captured, a snapshot set will include snapshots that are coordinated across the multiple volumes. The coordinator mechanism releases any writes being held for the volumes involved.

33 Claims, 7 Drawing Sheets

KERNEL-BASED CRASH-CONSISTENCY COORDINATOR

FIELD OF THE INVENTION

The present invention relates to computer disk storage. More specifically, the invention relates to the creation and maintenance of logical volumes used in system crash recovery and the like.

BACKGROUND OF THE INVENTION

A "snapshot" is essentially a logical copy of the information stored on a volume at a particular instant in time. A snapshot may be used like a backup copy of the volume, but is much faster to create than a full backup. As used herein, a "base volume" is the actual volume of which the snapshot was taken. A snapshot system uses a differential file to track the changes written to the base volume after the snapshot is captured. If multiple snapshots are taken over time, a differential file exists for each snapshot.

To maintain the snapshot data, when a change is written to an allocation unit (e.g., a cluster) that was in use at the time of the snapshot, the original data is copied from the allocation unit to the differential file before writing the new data. This method is often referred to as "copy-on-write." In this way, the state (i.e., snapshot) of the base volume at the time the snapshot was taken is accessible by reading current data from the base volume in conjunction with any data stored in the differential file associated with the snapshot.

In systems having multiple volumes, data or files may be distributed across more than one volume. Some programs may maintain large data files on one volume and log files on another volume. Many of those programs include the capability to recover the data and log files in the event of a system crash, but only if the crash occurred simultaneously across all affected volumes. However, existing snapshot systems do not have the ability to coordinate snapshot sets across multiple volumes so that crash recovery software or the like can reliably reconstruct related files distributed across those multiple volumes.

An efficient mechanism for coordinating snapshots across multiple volumes has eluded those skilled in the art.

SUMMARY OF THE INVENTION

The present invention provides a snapshot system capable of capturing snapshots of multiple volumes with each snapshot being coordinated. The snapshot system includes a coordinator mechanism, such as a filter driver, below the file system and above the volume manager for each volume. In operation, a snapshot manager determines which volumes are to be involved in a snapshot operation, and issues a message to the file system for each volume involved. Each of those messages includes information identifying the volumes involved in the snapshot operation. Preferably, the message causes the file system of each volume to perform functions in preparation for the snapshot operation, such as committing any file system cache operations (e.g., flushing a write cache) and requesting to minimize writes to the volume. In one embodiment, the file system makes its respective volume "consistent" so that no file system check program or log file restart operations need be executed on the snapshotted volume. A "consistent" file system is one in which no file system meta-data is changing. In other words, the file system allows changes to the contents of files but does not allow file or directory creations or growing or shrinking of files. When prepared, each file system passes its respective message down to the coordinator mechanism, and keeps the volume consistent until the message is returned.

The coordinator mechanism recognizes that a snapshot operation across multiple volumes is occurring from the first message passed down from a file system involved. As mentioned, each message identifies the volumes involved. Accordingly, the first message received causes the coordinator mechanism to await a confirmation from each file system involved that its respective volume is ready for the snapshot operation. When the coordinator mechanism has received the confirmation from the file systems involved, the coordinator mechanism begins holding subsequent writes to the volumes, and issues a message to a component responsible for capturing the snapshots in the snapshot set. That component may be a system driver or a hardware mechanism. When the snapshots are captured, the snapshot set will include snapshots that are coordinated across the multiple volumes. The coordinator mechanism then releases the writes being held for the volumes involved, which may then proceed with volume accesses as normal.

DETAILED DESCRIPTION

Exemplary Operating Environment

Figure 1:
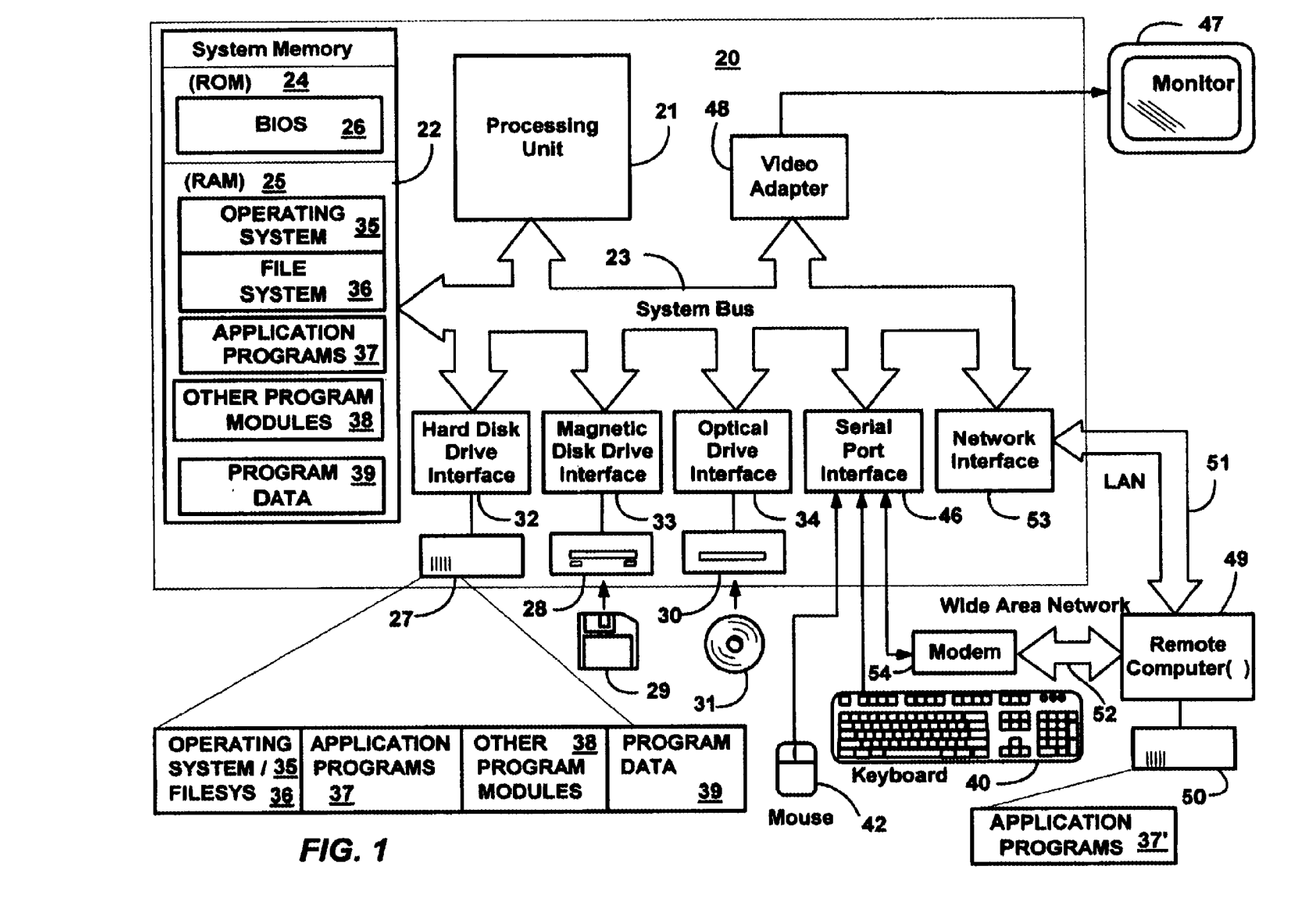
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types.

Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably Windows® 2000). The computer 20 includes a file system 36 associated with or included within the operating system 35, such as the Windows NT® File System (NTFS), one or more application programs 37, other program modules 38 and program data 39. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers 49. The remote computer (or computers) 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

The present invention may be described herein with reference to Microsoft Corporation's Windows 2000 (formerly Windows NT®) operating system, and in particular to the Windows NT® file system (NTFS). Notwithstanding, there is no intention to limit the present invention to Windows® 2000, Windows NT® or NTFS. Rather, the present invention is intended to operate with and provide benefits with any operating system, architecture, or file system.

Illustrative Snapshot System

Figure 2:
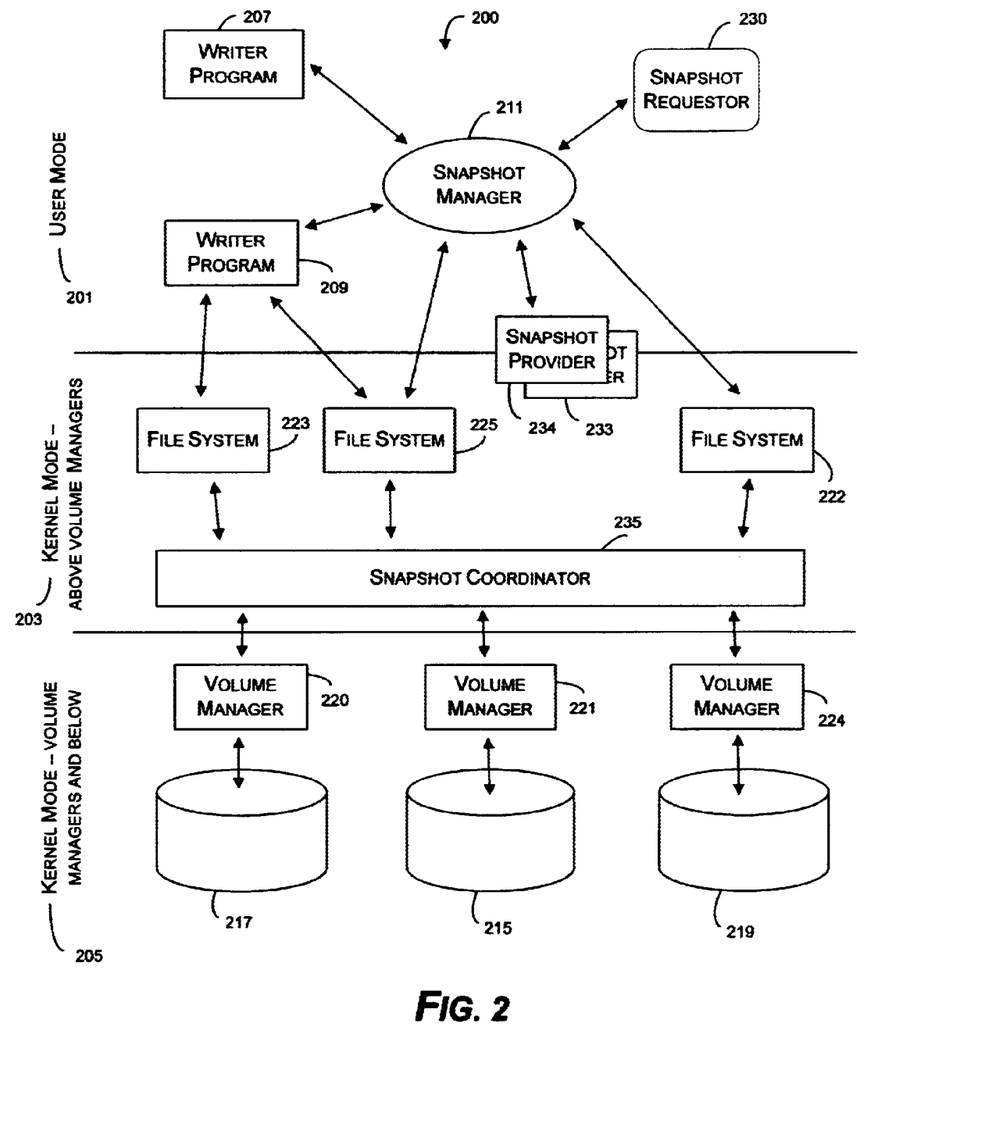
FIG. 2 is a block diagram representing a snapshot system capable of being used in conjunction with the computer system of FIG. 1 and in which the present invention may be embodied.

FIG. 2 and the following discussion provide a brief, general description of one embodiment of a snapshot system 200 operating within the personal computer 20 and through which the invention may be implemented. Snapshot systems in general are known. Additional information on other improved mechanisms for capturing and maintaining snapshots is set forth in U.S. Patent Application Ser. No. 09/505, 450, entitled System And Method For Growing Differential File On A Base Volume Of A Snapshot, and U.S. Patent Application Ser. No. 09/505,447, entitled Support For Multiple Temporal Snapshots Of Same Volume, both of which were filed on the same day and are assigned to the same assignee as the present application. Various components of the snapshot system 200 may reside in either a user mode 201 or a kernel mode of the operating system 35. In this example, the kernel mode is further divided into an upper kernel mode 203 (above volume managers) and a lower kernel mode 205 (volume managers and below). The user and kernel modes are illustrated for completeness only, and are not necessary to the present invention.

Resident in the lower kernel mode 205 are three storage volumes: a first volume 215, a second volume 217, and a third volume 219. As is known in the art, a volume comprises a fixed amount of storage on a disk, such as hard disk 27, tape or other storage medium. The term "volume" is often used as a synonym for the storage medium itself, but it is possible for a single disk to contain more than one volume or for a volume to span more than one disk. A volume manager, such as volume manager 221, controls low-level I/O operations on behalf of its associated volume. The volume managers each interact with a corresponding file system to carry out the I/O operations on the volume. For instance, the volume manager may communicate with a hardware device driver to perform reads and writes to the physical locations on the disk constituting the volume, and the file system may maintain the allocation status of the volume and handle I/O messages on behalf of the volume. In the disclosed example, file system 222 interacts with volume manager 224 to perform I/O operations on volume 219. Those skilled in the art will appreciate that, although each volume illustrated in FIG. 2 is associated with a unique volume manager, a single volume manager may control more than one volume.

Executing in the user mode 201 are writer programs, such as writer program 207 and writer program 209, which may be any programs capable of initiating a change to data stored on the volumes. Common examples of writer programs are Microsoft® Word, Microsoft® Exchange, and the like. The writer programs write to or read from the volumes by issuing I/O messages to the file systems associated with each volume. Also executing in the user mode 201 is a snapshot requester 230, which is a process that may issue a request for a snapshot to be taken of one or more volumes. Examples of a snapshot requester include a backup program and an operating system command.

A snapshot manager 211 is also included in the snapshot system 200 and resides in the user mode 201 of the illustrative snapshot system 200. The snapshot manager 211 is a program that coordinates a snapshot operation at a high level by interfacing with the components of the snapshot system 200, such as the writer programs, the snapshot requester 230, and the file systems.

One or more snapshot providers 233, 234 are included in the snapshot system 200 to perform the actual copy-on-write functions to create and maintain the snapshot. Although only two snapshot providers 233, 234 are illustrated in FIG. 2, a snapshot system may include multiple snapshot providers. For instance, each file system may be associated with its own snapshot provider, such as via a driver component of the snapshot provider below the file system in the driver stack. Alternatively, the operations necessary to capture or maintain the snapshot may be performed by hardware (not shown) within the personal computer 20.

In accordance with an aspect of the present invention, a snapshot coordinator 235 is included in the snapshot system 200, shown herein as being located in the upper kernel mode 203. In general, the snapshot coordinator 235 comprises a process that works with the snapshot manager 211 to coordinate snapshots across multiple volumes. As will be described in greater detail below, the snapshot coordinator 235 is responsible for selecting an appropriate instant at which to capture two or more snapshots such that the two or more snapshots are coordinated. In accordance with the disclosed embodiment, the snapshot coordinator 235 is a single and/or common driver that resides between each file system and each volume manager for each volume for which a snapshot will be taken.

As will be appreciated, the ordering of drivers in the I/O path of a message or request may be important to the proper functioning of the system. The present invention makes use of a novel numbering scheme when loading drivers to provide control over the order of the drivers in the I/O path of messages. Each driver may be assigned a unique alphanumeric decimal identifier, such as an "order number," that identifies the order in which drivers are loaded. The order number may take the form of "0.ABBBB," where the first character identified by "A" is used to define a general class or family of driver types, (e.g. antivirus drivers, encryption drivers, file system drivers, snapshot drivers, and the like). Although only one character in the order number is shown to define the class, it should be apparent that two or more characters may be reserved to identify the general classes of driver types.

The characters "BBBB" in the order number are used to order individual drivers within the general class of driver types. Through the use of a decimal scheme, rather than an integer or whole number scheme, it will be appreciated that a new individual driver may always be ordered between any two existing individual drivers by adding another character to the individual driver portion of the order number. For example, if a new driver must be ordered between existing drivers at 0.76241 and 0.76242, the new driver may be assigned order number 0.762415, which would then load between drivers 0.76241 and 0.76242.

Figure 3:
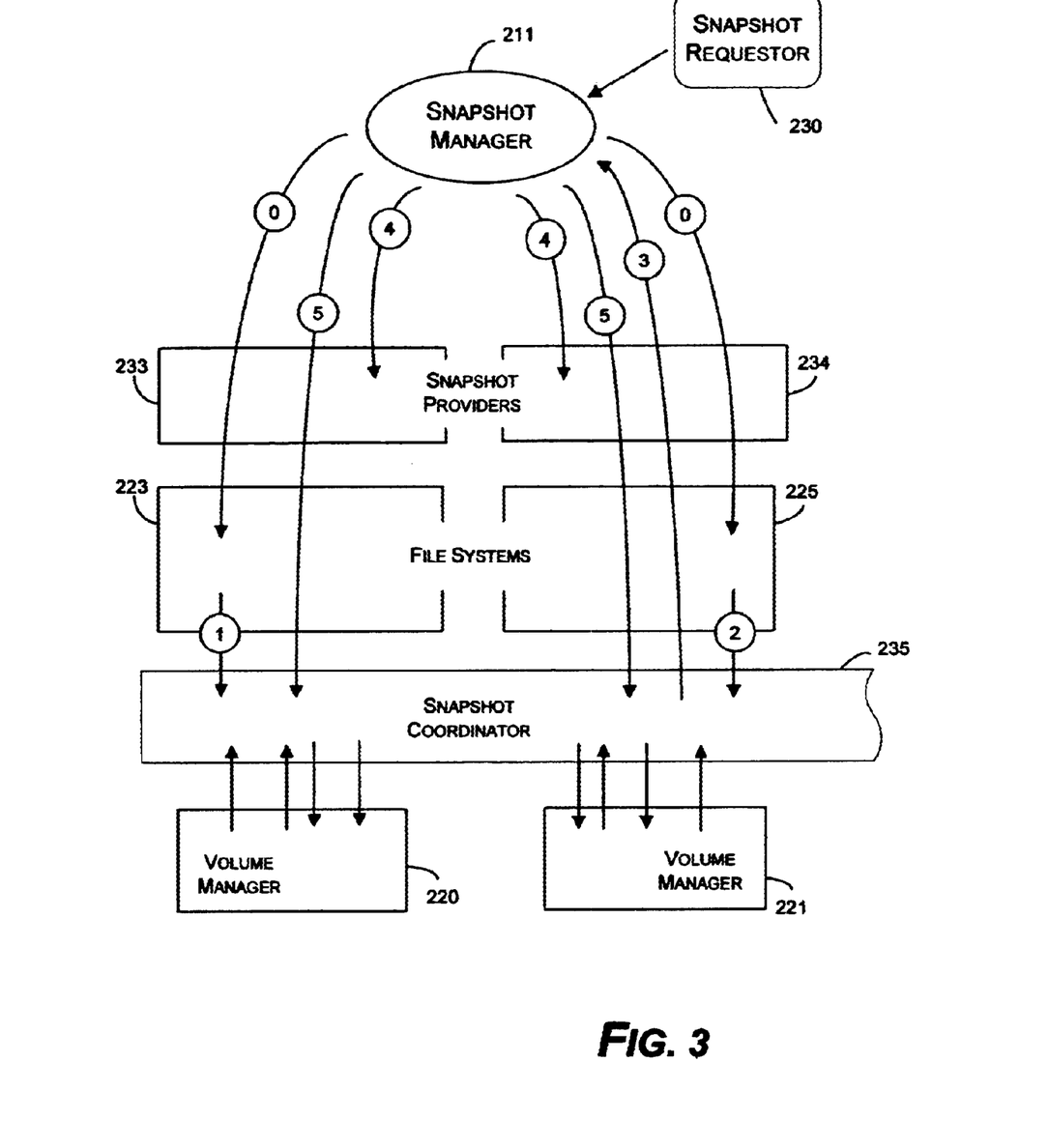
FIG. 3 is a functional block diagram exemplifying a movement of messages between various components of the snapshot system to capture a multiple-volume snapshot.
Figure 4:
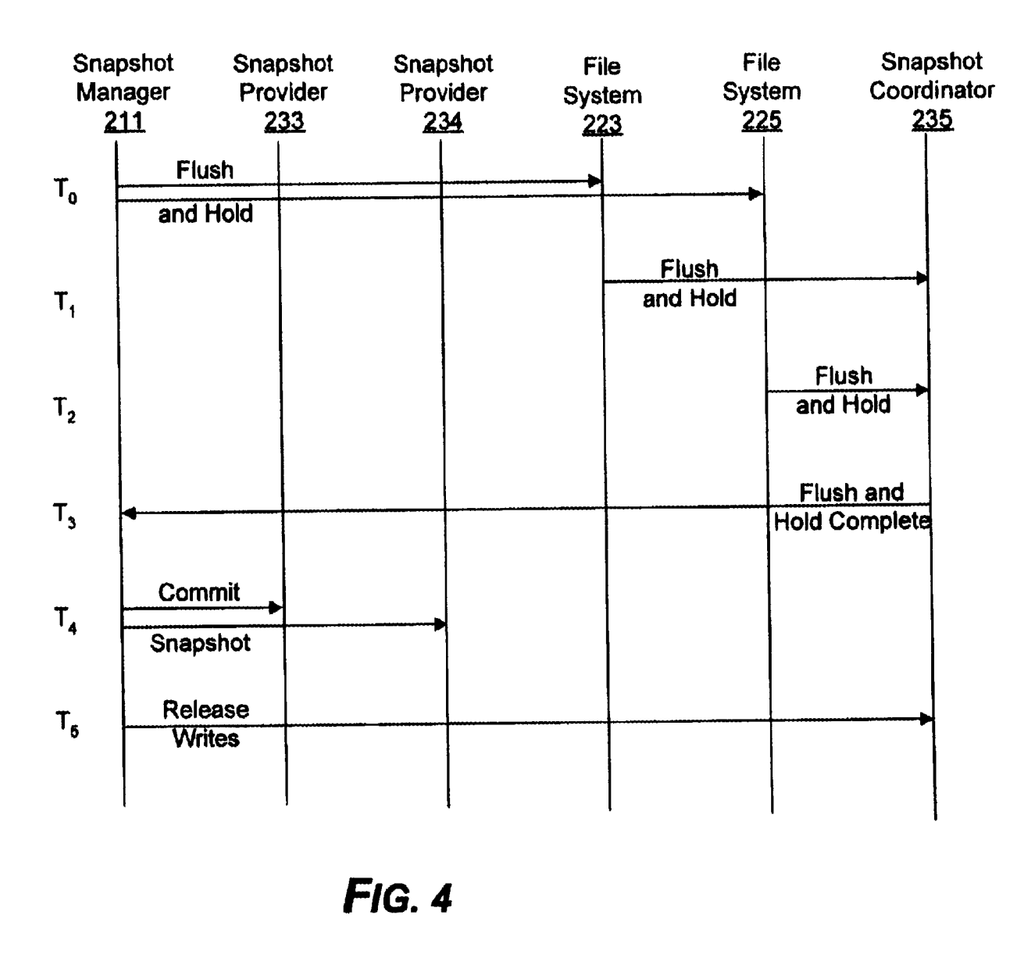
FIG. 4 is a timing diagram illustrating an exemplary sequence in which the messages illustrated in FIG. 3 are issued, in accordance with one embodiment of the invention.

FIGS. 3 and 4 together illustrate the operation of one embodiment of the present invention. FIG. 3 is a functional block diagram exemplifying the movement of messages between various components of the snapshot system 200 to capture a multiple-volume snapshot. Such messages may be in the form of I/O Request Packets (IRPs) where appropriate. FIG. 4 is a timing diagram illustrating an exemplary sequence in which those messages are issued. Referring first to FIG. 3, components of the snapshot system are illustrated, along with a flow of several messages between the snapshot manager 211, the snapshot providers 233, 234, the file systems 223 and 225, and the volume managers 220, 221 associated with volumes 217 and 219. Each arrow labeled with a number within a circle corresponds to a message transmitted between components of the snapshot system 200. The time at which each message was issued is indicated by the number of each arrow. For instance, the arrow from the snapshot manager 211 pointing to the file system 223 corresponds to message 0 which was issued at time $T_0$. In FIG. 4, each component illustrated in FIG. 3 is represented as a vertical line. The times ($T_0$–$T_5$) at which the various messages illustrated in FIG. 4 are issued are illustrated to the left of the vertical line representing the snapshot manager 211.

Referring now to both FIGS. 3 and 4, prior to time $T_0$ the snapshot manager 211 may issue a Flush Volume message to each participating volume in order to prepare (e.g., pre-flush the caches of) the volumes for the snapshot operation. Some time later at a time $T_0$, the snapshot manager 211 issues a Flush and Hold message, essentially in parallel, to each file system participating in the snapshot, e.g., file systems 223 and 225 in this example. The Flush and Hold message includes information such as a Globally Unique Identifier (GUID) for the snapshot (or any other identifier capable of distinguishing this request from others) and the number of volumes participating in the snapshot. The information may additionally include the identity of each volume involved in the snapshot. As described below, the information will be used later by the snapshot coordinator 235 when coordinating which volumes are involved in the snapshot.

The Flush and Hold message may cause the file systems 223, 225 to flush any cache associated with the file system to disk, to commit any file logs associated with the file systems, and to perform other tasks associated with holding further write requests to the volumes 217, 219. Certain advanced file systems, such as the NT File System (NTFS), may, in response to the Flush and Hold message, commit and hold metadata writes associated with their respective volumes. One benefit thus enabled is that the snapshot of that volume may be later mounted with the advanced file system in a native read-only mode, which is advantageous for snapshot systems.

In accordance with another aspect of the present invention, the snapshot coordinator 235 is able to adjust its capabilities to match a file system's capabilities. More particularly, certain file systems may not be capable of performing a Flush and Hold operation in response to a Flush and Hold message. In that case, the Flush and Hold message may be passed directly through to the snapshot coordinator 235. For example, in the Windows® 2000 operating system, drivers that do not have the capability to perform an action requested in a particular IRP simply pass the IRP to the next driver. In that case, such a file system driver would pass a Flush and Hold IRP, without taking action toward preparing the volume for the snapshot, to the snapshot coordinator 235.

When the file system is through with the Flush and Hold message, e.g. it has completed its flushing operation and has begun holding certain write operations, the file system passes the message to the snapshot coordinator 235. Each file system 223, 225 may take a different amount of time to complete its respective Flush and Hold message. Accordingly, at time $T_1$, file system 223 completes its Flush and Hold message and passes the message to the snapshot coordinator 235. As mentioned above, the Flush and Hold message may include a GUID and the number of volumes participating in the snapshot. Accordingly, when the snapshot coordinator 235 receives the first Flush and Hold message, the snapshot coordinator 235 knows that a snapshot of multiple volumes is occurring, and knows how many Flush and Hold messages are associated with that GUID. Thus, the snapshot coordinator 235 begins waiting for the Flush and Hold messages from each other file system involved in the snapshot. In this example, between time $T_1$ and time $T_2$, only the Flush and Hold message of file system 225 remains outstanding. The snapshot coordinator 235 may time out and fail the snapshot request if the other Flush and Hold messages are not received within a given amount of time.

At time $T_2$, file system 225 completes its Flush and Hold message and passes that message to the snapshot coordinator 235. In this example, only two volumes are involved in the snapshot. Accordingly, the snapshot coordinator 235 determines, via the GUID and a volume counting mechanism, that it has received the full set of Flush and Hold messages issued by the snapshot manager 211 for this particular request. In response, at time $T_3$, the snapshot coordinator 235 issues a message to the snapshot manager 211 indicating that all the file systems 223, 225 have completed the Flush and Hold message. Although illustrated in FIG. 3 as a single message, the snapshot coordinator 235 may in fact issue a series of messages corresponding to each Flush and Hold message initially issued by the snapshot manager 211, such as a Flush and Hold Complete message (whereby, for example, the snapshot manager 211 may instead perform the counting operation).

In keeping with the present invention, at time $T_3$ and thereafter, the snapshot coordinator 235 intercepts and holds all subsequent write messages issued by the file systems 223, 225 to the volume managers 220, 221. It should be noted that for certain advanced file systems, such as the NTFS file system, certain messages may not be held, such as write requests to a pagefile stored on a volume involved in the snapshot.

As a result of holding the writes at the snapshot coordinator 235, each volume involved in the snapshot is in a quiescent state and is ready for the snapshot. To capture the snapshots, the snapshot manager 211 issues a Commit Snapshot message to each snapshot provider 233,234 involved in the snapshot. The snapshot providers 233, 234 perform the actual operation of constructing the kernel data structures (e.g., bitmaps and indexes) that characterize and define a snapshot volume for the computing system 20. The snapshot providers may, optionally, include a common identifier (e.g., a GUID) and a volume count with each snapshot captured. In that way, coordinated snapshots may be later discovered by retrieving the common identifier for one snapshot and querying other snapshots, up to the volume count, to identify those having the same common identifier. When each snapshot provider has successfully completed its function, it returns a notice of success to the snapshot manager 211.

At time $T_5$, the snapshot manager 211 issues a Release Writes message to the snapshot coordinator 235 instructing it to release the writes held at time $T_3$ in response to either all snapshot providers returning success, any snapshot provider returning a failure, or a time out waiting for the snapshot providers. In a situation other than when all snapshot providers return success, the snapshot manager 211 may issue an additional message (not shown) to the snapshot requester indicating that the snapshot failed, whereby the snapshot coordinator 235 will release the writes. The snapshot coordinator 235 may time out, release the writes on its own, and return a failure if the snapshot manager does not return a Release Writes message within a given amount of time.

Operation of the Snapshot System

Figure 5:
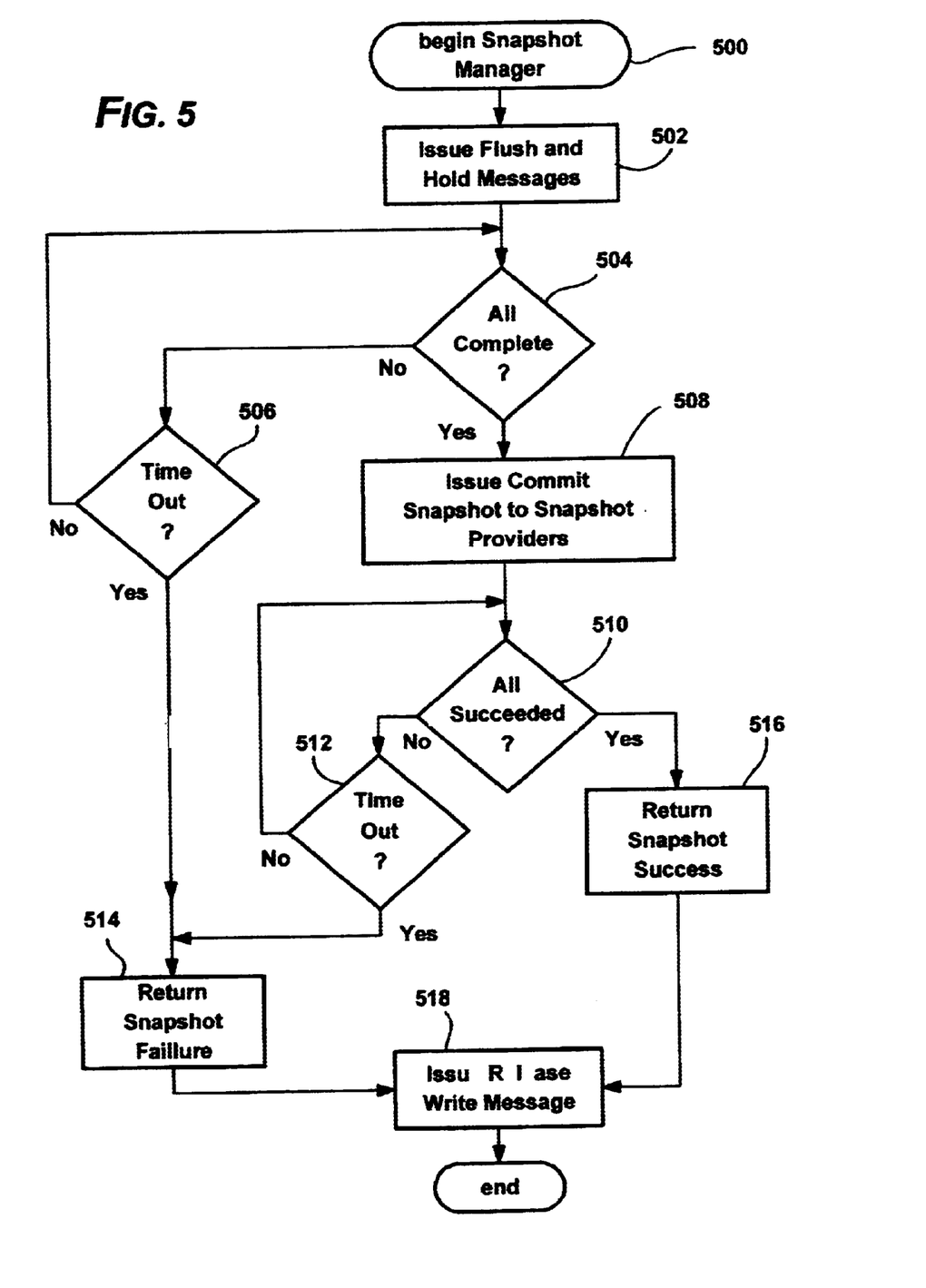
FIG. 5 is a logical flow diagram illustrating a process performed by one component of the snapshot system illustrated in FIG. 2 to capture a multiple-volume snapshot in accordance with one embodiment of the present invention.
Figure 6:
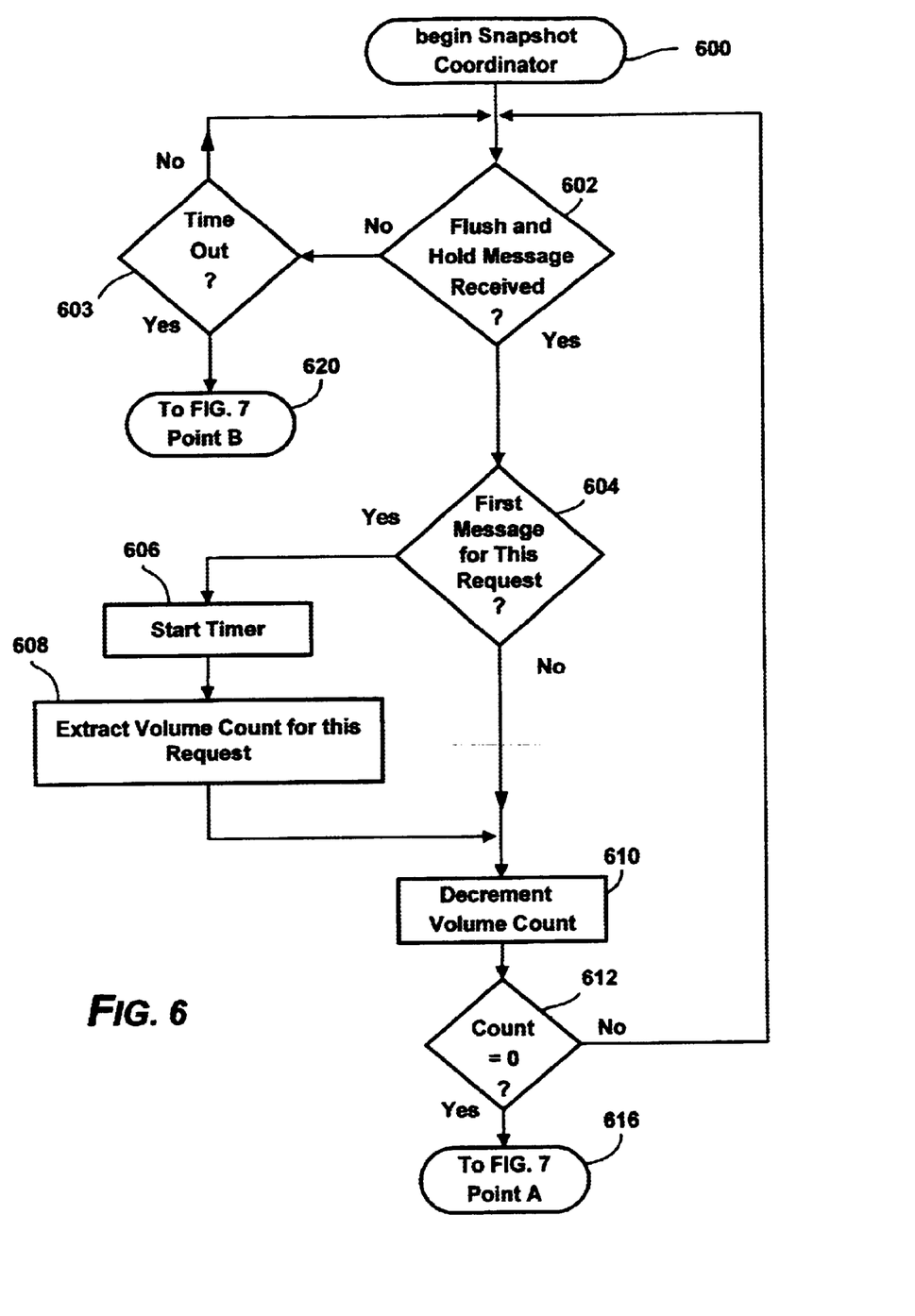
FIG. 6 is a logical flow diagram illustrating a process performed by another component of the snapshot system illustrated in FIG. 2 to capture a multiple-volume snapshot in accordance with one embodiment of the present invention.
Figure 7:
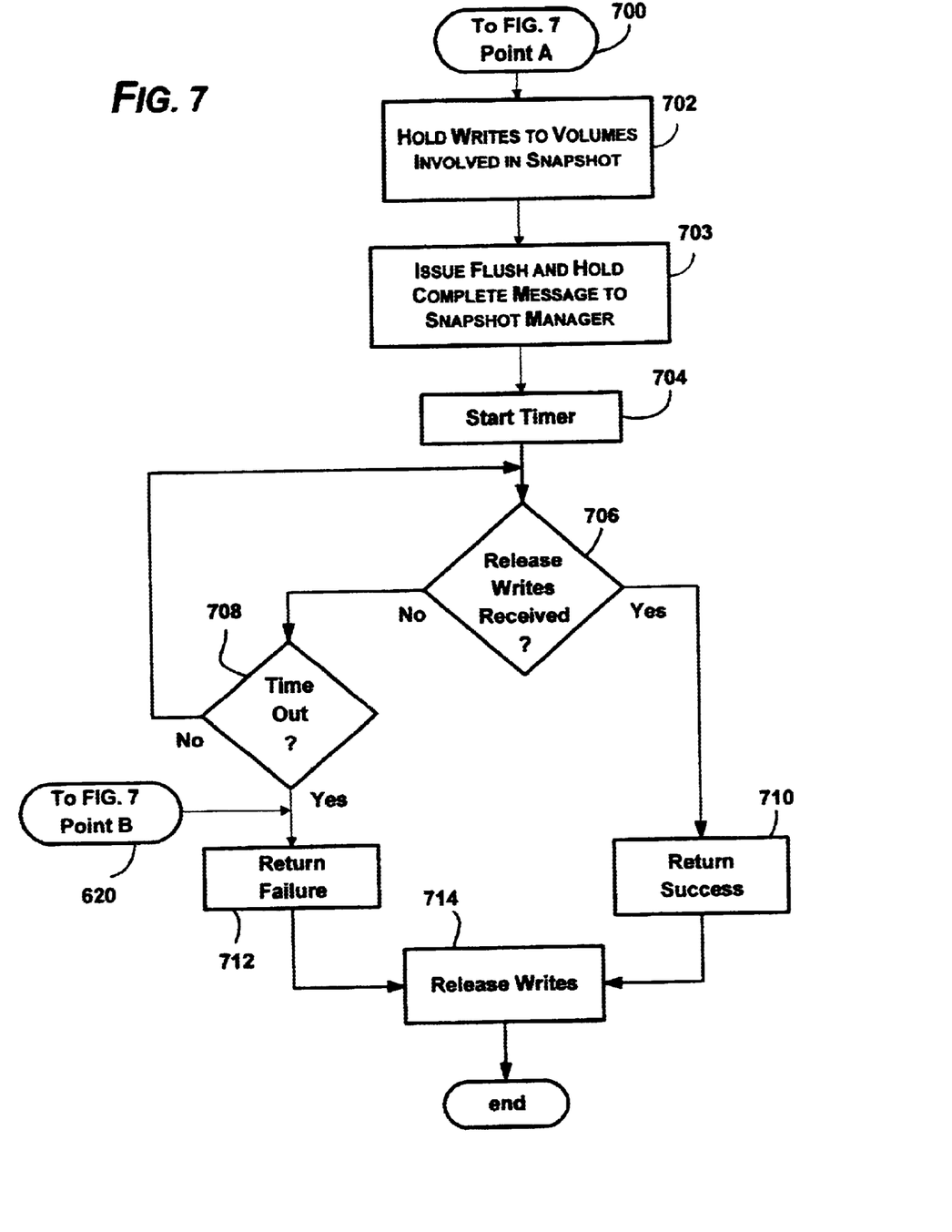
FIG. 7 is a logical flow diagram illustrating a continuation of the process illustrated in FIG. 6.

FIGS. 5–7 are logical flow diagrams illustrating processes performed by a snapshot system implementing the invention, such as the example snapshot system 200. Referring first to FIG. 5, a process performed by the snapshot manager 211 enters at starting block 500, where a multiple-volume snapshot operation has been requested by the snapshot requester 230. The snapshot manager 211 begins the snapshot operation by issuing appropriate messages to other components of the snapshot system 200, such as the Flush and Hold messages to the file systems as described above and below.

At block 502, the snapshot manager 211 issues Flush and Hold messages to each file system participating in the snapshot operation. As mentioned above, each flush and hold message may include a GUID and a count of the number of volumes involved in the snapshot.

Via decision blocks 504–506, the snapshot manager 211 awaits a notification from the snapshot coordinator 235 (as described in FIGS. 6 and 7) that the file systems have completed the flush and hold messages. Unless the snapshot manager 211 times out at decision block 506, when the snapshot manager 211 receives a notice from the snapshot coordinator 235 that all flush and hold messages have been completed by the file systems the process continues to block 508. Although shown and described herein as part of a test within a loop, it will be appreciated that the timeout mechanism (and others described herein) can alternatively be an event-driven operation.

At block 508, the snapshot manager 211 has received the notification from the snapshot coordinator 235 and issues a Commit Snapshot message to the snapshot provider associated with each volume participating in the snapshot.

Via decision blocks 510–512, the snapshot manager 211 again awaits notification from each snapshot provider that its respective snapshot was successful. Unless the snapshot manager 211 times out at decision block 512, the process continues to block 516 upon the receipt from each snapshot provider that its respective snapshot was successful.

At block 516, if all snapshots were successful, the snapshot manager 211 returns a Snapshot Success message to the snapshot requester 230, and, at block 518, issues a Release Writes message to the snapshot coordinator 235. If the snapshot manager 211 timed out at either decision block 506 or decision block 512, an appropriate failure message is returned to the snapshot requester 230, and the snapshot manager 211 issues a Release Write message to the snapshot coordinator 235.

FIGS. 6 and 7 illustrate an exemplary process performed by the snapshot coordinator 235 in accordance with one embodiment of the present invention. The process begins at block 600 when the snapshot coordinator 235 is loaded. At decision blocks 602 and 603, the snapshot coordinator 235 awaits a Flush and Hold message from a file system while passing other messages through to other drivers in the stack. In other words, at decision block 602, the snapshot coordinator 235 determines if the message has been received, and if not, whether a timer (set below at block 606) has expired (block 603). If a first Flush and Hold message has not yet been received, then the timer has not yet been started and the process continues to await one at decision blocks 602 and 603 until a first Flush and Hold message is received. When the snapshot coordinator 235 receives a Flush and Hold message at decision block 602, the process continues to decision block 604.

As mentioned above, each Flush and Hold message may take the form of an I/O Request Packet (IRP) including a GUID uniquely identifying the snapshot requested, and a count of the number of volumes involved in the snapshot request. Based on that information, at decision block 604, the snapshot coordinator 235 determines whether the Flush and Hold message received at block 602 is the first message associated with the GUID. Note that because of the use of GUIDs, multiple snapshot sets may be requested and coordinated at the same time. If the snapshot coordinator 235 is not currently awaiting Flush and Hold messages having the same GUID as that from the current Flush and Hold message, then the current Flush and Hold message is the first message for this request. Accordingly, the process branches to block 606.

At block 606, the snapshot coordinator 235 initiates a timer (e.g., a sixty second timer) for this request, essentially to prevent the system from hanging if the snapshot coordinator 235 fails, for whatever reason, to receive the full set of Flush and Hold messages associated with the request. At block 608, the snapshot coordinator 235 extracts the volume count from the information stored in the Flush and Hold message received at block 602. At block 610, after the volume count has been determined at block 608, and similarly if the Flush and Hold message received at decision block 604 was not the first message, the volume count is decremented and the process continues to decision block 612.

If, at decision block 612, the volume count has been decremented to zero, the process continues to entry Point A of FIG. 7. Otherwise, the process returns to decision block 602 and awaits further Flush and Hold messages. If at decision block 603, the timer set at block 606 expires before the snapshot coordinator 235 receives every Flush and Hold message associated with the currently requested snapshot, the process fails by continuing to entry Point B of FIG. 7.

Turning to entry Point A (block 700) of FIG. 7, once the snapshot coordinator 235 has received the Flush and Hold messages from each file system associated with the snapshot, the snapshot coordinator 235 determines when the snapshots should be attempted. To that end, at block 702, the snapshot coordinator 235 intercepts and holds all write requests issued by the file systems involved in the snapshot. In addition, the snapshot coordinator 235 waits for any outstanding write operations to complete on the volumes involved in the snapshot. At this point, the volumes involved in the snapshot should be quiesced with respect to writes, and are quiesced at a common moment. When this state is achieved, the snapshot coordinator 235 issues a Flush and Hold Complete message to the snapshot manager 211. Thus, in another process, such as the process illustrated in FIG. 5, the snapshot manager 211 may cause the multiple snapshots to be captured. At block 704, the snapshot coordinator 235 may, optionally, initiate an appropriate timer in case the snapshot manager 211 does not return with a message, e.g., a Release Writes message to release the writes being held for these volumes.

At decision block 706, the snapshot coordinator 235 awaits the Release Writes message from the snapshot manager 211. If, at decision block 708, the timer set at block 704 times out, the process branches to block 712 where the snapshot coordinator 235 returns a Failure to the snapshot requester 230. Likewise, if, at decision block 603 of FIG. 6, the first timer set timed out before all Flush and Hold messages were received, via entry Point B of FIG. 7, a Failure is returned to the snapshot requester 230 at block 712. In addition, the snapshot manager 211 may cancel each Flush and Hold message originally issued, or the file system may cancel one or more Flush and Hold messages if the use of its volume becomes urgent.

If, at decision block 706, the Release Writes was received, the process continues to block 710, where a Success is returned to the snapshot requester 230. Note that this does not necessarily indicate that the snapshot was successful, only that the Release Writes message (which may have been sent by the snapshot manager 211 because of either a success or a failure) was successfully handled. At block 714, the snapshot coordinator 235 releases the writes that were held at block 703, and the process ends for this request.

What is claimed is:

1. In a computer system having a plurality of volumes, a method comprising:

receiving a request to capture a set of snapshots of a corresponding set of volumes in the plurality of volumes;

coordinating a snapshot-ready state for each volume in the set, including preparing each volume for the snapshot;

providing information indicative of when each volume in the set is in the snapshot ready state;

after receiving the request to capture the set of snapshots, receiving a write request to one of the volumes in the set of snapshots and holding the write request;

enabling the snapshots when each volume in the set is in the snapshot-ready state; and capturing the snapshot for each volume and providing the set of snapshots when the snapshot for each volume is successfully captured.

2. The method of claim 1 wherein receiving the request to capture a set of snapshots includes receiving a message from a file system.

3. The method of claim 1 wherein the request corresponds to a snapshot-ready state of at least one of the volumes.

4. The method of claim 1 wherein the request includes a distinct identifier for the request.

5. The method of claim 1 wherein the request includes a count corresponding to the number of volumes in the set.

6. The method of claim 5 wherein the request corresponds to a snapshot-ready state of at least one of the volumes.

7. The method of claim 1 wherein the request corresponds to a snapshot-ready state of one of the volumes, and wherein coordinating the snapshot-ready state for each volume in the set includes receiving at least one other request corresponding to a snapshot-ready state of each of the other volumes in the set.

8. The method of claim 7 wherein each request comprises a flush and hold request, and wherein preparing each volume for the snapshot includes flushing cached writes to at least one volume and holding at least one other write request to at least one volume.

9. The method of claim 1 wherein coordinating the snapshot-ready state for each volume in the set includes holding at least one write request to at least one of the volumes of the set.

10. The method of claim 9 further comprising releasing each held write request.

11. The method of claim 1 wherein enabling the snapshots includes sending a message.

12. In a computer system, a method, comprising:
preparing each volume of a set of volumes for capturing a coordinated snapshot of the set;
receiving a first message corresponding to a first volume, the first message having information identifying the set of volumes for which the coordinated snapshot has been requested;
receiving at least one other message corresponding to at least one other volume of the set;
determining whether a full set of messages associated with the request has been received, the full set comprising at least one message corresponding to each volume of the set; and
if the full set of messages has been received, enabling the coordinated snapshot to occur.

13. The method of claim 12, wherein if the full set of messages has not been received, providing a period of time within which to receive the full set of messages.

14. The method of claim 13, wherein if the full set of messages has not been received within the period of time, issuing a failure message.

15. The method of claim 12, wherein if the full set of messages has not been received, issuing a failure message.

16. A computer-readable medium having computer-executable instructions for performing the method of claim 1.

17. A computer-readable medium having computer-executable instructions for performing the method of claim 12.

18. In a computing environment, a system comprising:
at least one snapshot provider configured to capture snapshots of a plurality of volumes, each volume having an associated file system; and
a snapshot coordinator that communicates with the file system of each volume to:
1) prepare each volume for the snapshot;
2) receive information from the file system informing the coordinator when each volume is prepared;
3) cause at least one subsequent write request to the volumes to be held;
4) issue a message to the at least one snapshot provider to capture the snapshots of the volumes; and
5) release each subsequent write request being held.

19. The system of claim 18 wherein the snapshot coordinator prepares each volume for the snapshot by flushing any cached writes to the volume.

20. The system of claim 18 wherein the snapshot coordinator holds at least one write request to at least one of the volumes.

21. The system of claim 18 wherein the snapshot coordinator releases each subsequent write request being held upon a message from each snapshot provider indicative of a successful snapshot.

22. The system of claim 18 wherein the snapshot coordinator instructs the file system to hold at least one write request to a corresponding volume.

23. The system of claim 22 wherein the snapshot coordinator instructs the file system to release each subsequent write request being held upon a message from each snapshot provider indicative of a successful snapshot.

24. The system of claim 18 wherein the snapshot coordinator releases each subsequent write request being held upon a message from any snapshot provider indicative of an unsuccessful snapshot.

25. The system of claim 18 wherein the snapshot coordinator releases each subsequent write request being held when any snapshot provider does not provide a message indicative of a successful snapshot within a time period.

26. The system of claim 18 wherein the coordinator mechanism comprises a filter driver between the file system and a volume manager for each volume.

27. In a computing environment, a method comprising:
obtaining information indicating which of a set of volumes are to be involved in a snapshot operation;
issuing a message to a file system for each volume involved, each message including information identifying the volumes involved in the snapshot operation and causing the file system of each volume to prepare for the snapshot operation;
receiving at a coordinator mechanism a first message from a first file system indicating that a snapshot operation across multiple volumes is occurring;
awaiting at the coordinator mechanism information from each file system indicating that its respective volume is ready for the snapshot operation, and when each is ready, the coordinator mechanism:
a) holding subsequent writes to the volumes;
b) issuing a message to at least one snapshot capturing component to capture the snapshots in the set;
c) awaiting result information from the at least one snapshot capturing component; and
d) releasing the writes being held for the volumes involved.

28. A computer-readable medium having computer-executable instructions for performing the method of claim 27.

29. The method of claim 12 wherein each message indicates that its respective volume is ready for the snapshot operation.

30. In a computing environment, a method comprising:
receiving at a coordinator a request to capture a set of snapshots, each snapshot corresponding to a volume in a plurality of volumes;
commencing capturing the set of snapshots;
while capturing the set of snapshots, receiving a write request at the coordinator and holding the write request at the coordinator until capturing of the set of snapshots completes or fails, the write request including data to write to at least one of the volumes corresponding to the set of snapshots; and
after capturing the set of snapshots completes or fails, releasing the write request, the write request causing data to be written to the at least one of the volumes corresponding to the set of snapshots.

31. The method of claim 30, further comprising receiving in the request to capture a set of snapshots, a count corresponding to the number of volumes in the set and a snapshot-ready state of at least one of the volumes.

32. The method of claim 31, further receiving a message indicating a snapshot-ready state of at least another one of the volumes corresponding to the set of snapshots.

33. A computer-readable medium having computer-executable instructions for performing the method of claim 30.

* * * * *